United States Patent
Gandhi et al.

(10) Patent No.: US 10,401,847 B2
(45) Date of Patent: Sep. 3, 2019

(54) SYSTEM AND METHOD FOR ISSUE DETECTION OF INDUSTRIAL PROCESSES

(71) Applicant: General Electric Company, Schenectady, NY (US)

(72) Inventors: Devang Jagdish Gandhi, Atlanta, GA (US); Sanjeev Shyam Heda, Atlanta, GA (US); Xiaomo Jiang, Atlanta, GA (US); Bradley Wile, Atlanta, GA (US); Kevin Metz, Atlanta, GA (US); James John D'Amato, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/376,149

(22) Filed: Dec. 12, 2016

(65) Prior Publication Data
US 2018/0165384 A1 Jun. 14, 2018

(51) Int. Cl.
*G06F 17/10* (2006.01)
*G05B 23/02* (2006.01)

(52) U.S. Cl.
CPC .......... *G05B 23/0254* (2013.01); *Y02E 40/76* (2013.01); *Y02E 60/76* (2013.01); *Y02P 90/02* (2015.11); *Y02P 90/86* (2015.11); *Y04S 10/545* (2013.01); *Y04S 40/22* (2013.01)

(58) Field of Classification Search
CPC .................. G06F 17/5004; G05B 23/0254
USPC ............................................................ 703/2
See application file for complete search history.

(56) References Cited

U.S. PATENT DOCUMENTS

| | | |
|---|---|---|
| 8,311,774 B2 | 11/2012 | Hines |
| 8,660,980 B2 | 2/2014 | Herzog |
| 8,781,979 B2 | 7/2014 | Seo et al. |
| 2008/0086283 A1 | 4/2008 | Yuan et al. |
| 2012/0084042 A1 | 4/2012 | Yuan |

FOREIGN PATENT DOCUMENTS

| | | |
|---|---|---|
| WO | 2007/064860 A1 | 6/2007 |
| WO | 2015/121176 A1 | 8/2015 |

OTHER PUBLICATIONS

Hines, J.W. and Garvey, D.R., "Development and Application of Fault Detectability Performance Metrics for Instrument Calibration Verification and Anomaly Detection," Journal of Pattern Recognition Research, vol. 1, No. 1, pp. 1-14 (2006).

Hoff, P.D. and Niu, X., "A Covariance Regression Model", Retrieved from the Internet URL: https://arxiv.org/pdf/1102.5721v1.pdf, on May 30, 2018, pp. 1-31 (Feb. 28, 2011).

International Search Report and Written Opinion issued in connection with corresponding PCT Application No. PCT/US17/61355 dated Feb. 28, 2018, 11 pp.

*Primary Examiner* — Hugh M Jones
(74) *Attorney, Agent, or Firm* — Fletcher Yoder P.C.

(57) ABSTRACT

A system is provided comprising a memory configured to store instructions and a processor configured to execute the instructions. The processor is configured to execute the instructions to receive sensor data comprising sensed operations for a machinery, the sensed operations sensed via one or more sensors disposed in the machinery, and to derive a first model matrix based on the sensor data. The processor is further configured to derive a covariance regression model based on the first model matrix, wherein the covariance regression model is configured to be executed to derive a predictive event based on operational machinery data as input.

17 Claims, 3 Drawing Sheets

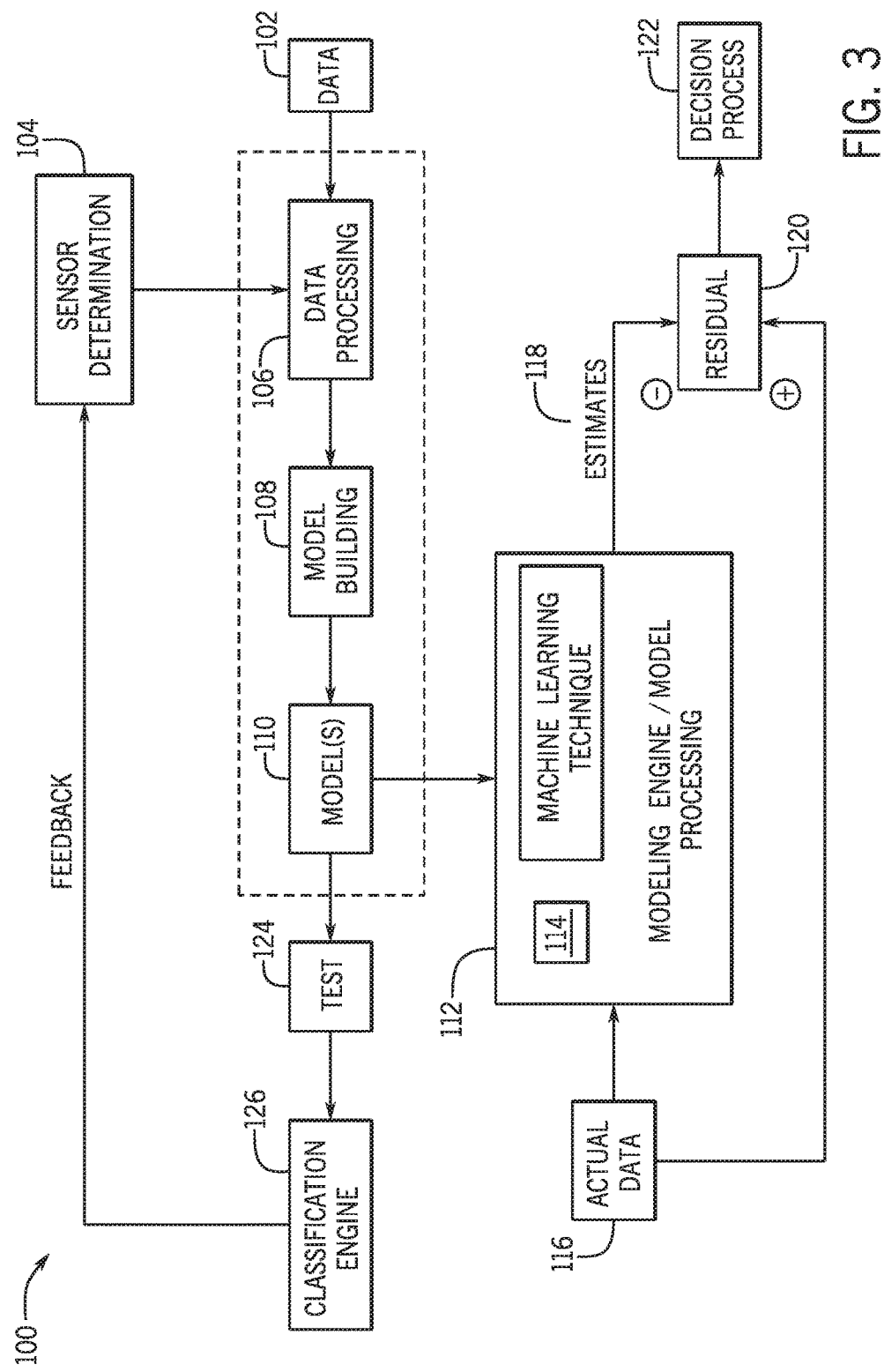

SYSTEM AND METHOD FOR ISSUE DETECTION OF INDUSTRIAL PROCESSES

BACKGROUND OF THE INVENTION

The subject matter disclosed herein relates to turbine systems, and more specifically to detection of certain issues in industrial processes A variety of industrial processes and machine systems, such as turbine systems, may include a complex mechanical interrelationship between different components and subcomponents. For example, a turbine may include one or more rotor stages (e.g., wheels and blades) capable of an axial rotation. The blades or buckets of each stage are capable of converting a fluid flow into a mechanical movement. Currently, manual inspection and testing procedures are used to determine if a component has certain issues and is due for repair or replacement. Such inspection and testing may require the shutdown of the turbine system, which is typically time consuming and expensive. It would be beneficial to improve issue detection in turbine systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided comprising a memory configured to store instructions and a processor configured to execute the instructions. The processor is configured to execute the instructions to receive sensor data comprising sensed operations for a machinery, the sensed operations sensed via one or more sensors disposed in the machinery, and to derive a first model matrix based on the sensor data. The processor is further configured to derive a covariance regression model based on the first model matrix, wherein the covariance regression model is configured to be executed to derive a predictive event based on operational machinery data as input.

In a second a method includes receiving, via a processor, sensor data comprising sensed operations for machinery, the sensed operations sensed via one or more sensors disposed in the machinery, and deriving, via the processor, a first model matrix based on the sensor data. The method also includes deriving, via the processor, a covariance regression model based on the covariance matrix, wherein the covariance regression model is configured to be executed to derive a predictive event based on operational machinery data as input.

In a third embodiment, a tangible, non-transitory computer-readable media storing computer instructions thereon is provided. The computer instructions, when executed by a processor, cause the processor to receive sensor data comprising sensed operations for a machinery, the sensed operations sensed via one or more sensors disposed in the machinery. The computer instructions, when executed by a processor, additionally cause the processor to derive a first model matrix based on the sensor data and to derive a covariance regression model based on the first model matrix, wherein the covariance regression model is configured to be executed to derive a predictive event based on operational machinery data as input.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 depicts a flow chart of an embodiment of process suitable for detecting and/or predicting issue for the turbine system of FIG. 1.

DETAILED DESCRIPTION OF THE INVENTION

Figure 1:
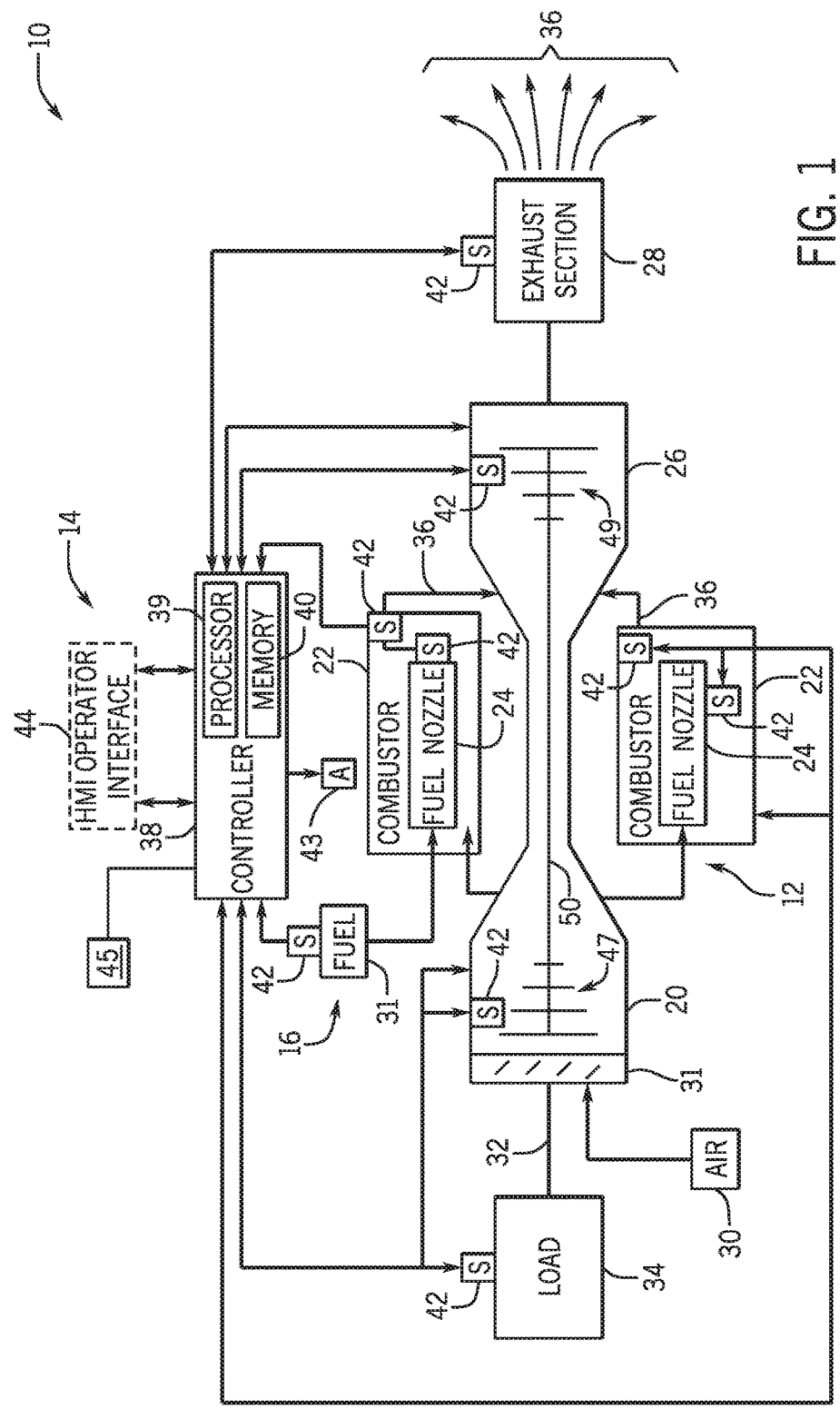
FIG. 1 depicts a block diagram an embodiment of a turbine system, including an issue detection and/or prediction system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein provide for the creation of hybrid models that combine kernel regression empirical models (e.g., having physics-based subcomponent models embedded within) with machine learning systems. In one embodiment, a model is used within a kernel regression paradigm to estimate expected behavior of the turbine system. The expected estimates and the actual data is then further analyzed using machine learning classification approaches to extract unplanned maintenance event patterns.

Model and basis vectors are used to compare with the test vectors. This comparison technique ultimately results in a similarity measure, one such example of the similarity measure is the Euclidean distance between a test vector and the basis vectors. These measures may then be normalized for example using the sensor ranges of the modeled vectors. The normalized similarity measures may then be mapped onto a Gaussian distribution. It is to be noted that any continuous function that is increasing or decreasing over a domain of the similarity measure and maps to a defined range (ex: zero to one) may be used, such as a sigmoid function, resulting in gross weights for each of the basis vectors. The gross weights may be normalized such that they sum to one. The normalized-weights may be multiplied with the basis vectors and the results are aggregated by sensors. The outcome of such a multiplication and aggregation step may include the above mentioned expected estimates. Lastly, a difference between the test vector and its corresponding estimate may be computed as a measure of comparison (residual). A machine learning classification technique, such as a random forest, clustering, deep learning, and so on, may then be used to identify artificial intelligence (AI) models. These AI models may then be used during a real-time analysis to identify anomalies that may appear as deviation in the residual of run-time vectors.

It may be beneficial to first discuss embodiments of certain industrial processes and/or mechanical systems that may be used with the disclosed embodiments. With the foregoing in mind and turning now to FIG. 1, the figure is a diagram illustrating an industrial power production system 10 (e.g., part of an industrial process for the production of power), such as a power plant, that includes a gas turbine system 12, a monitoring and control system 14, and a fuel supply system 16. The gas turbine engine or system 12 may include a compressor 20, combustion systems 22, fuel nozzles 24, a gas turbine 26, and an exhaust section 28. During operation, the gas turbine system 12 may pull an oxidant such as air 30 into the compressor 20, which may then compress the air 30 and move the air 30 to the combustion system 22 (e.g., which may include a number of combustors). The air 30 may encounter an inlet guide vane system 31 having vanes that may be positioned at a variety of angles to optimize intake of the air 30 and operations of the gas turbine system 12.

In the combustion system 22, the fuel nozzle 24 (or a number of fuel nozzles 24) may inject fuel that mixes with the compressed air 30 to create, for example, an air-fuel mixture. The air-fuel mixture may combust in the combustion system 22 to generate hot combustion gases, which flow downstream into the turbine 26 to drive one or more turbine stages. For example, the combustion gases may move through the turbine 26 to drive one or more stages of turbine blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, and so forth.

In the current embodiments, data from the sensors 42 may be collected and analyzed by a Covariance Regression Anomaly Detection (CReAD) system 45 (e.g., issue detection and/or prediction system 45). For example, data from the sensors 42 may be collected, including data related to compressor wheels 47 and turbine wheels 49 which are connected via a shaft system 50. The CReAD system 45 may derive one or more models by using covariance regression techniques based on covariance matrix selection, as described in more detail below. Indeed, rather than applying traditional bandwidth analysis typical to kernel regression, the techniques described herein may replace traditional bandwidth analysis or modeling with covariance matrix creation to derive one or more models that may apply sensor data more accurately. The models may then be further processed by applying statistical techniques such as sequential probability ratio test, persistence test, run of signs and so on, and machine learning techniques, such as a random forest, clustering, deep learning, and so on. The processed models may then be executed during operations of the power production system 10 to derive that certain undesired conditions are found and/or to forecast that certain undesired conditions will happen in the future. The detection of issues and/or forecasts may then be used, for example, to control operations of the power production system 10, to issue alarms, alerts, and so on. The CReAD system 45 may be included in the controller 38, in an external computing system (e.g., separate of the controller 38), or in a combination thereof.

In certain embodiments, the HMI operator interface 44 may be executable by one or more computer systems of the system 10. A plant operator may interface with the industrial system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38. Further, operational information from the controller 38 and/or the sensors 42 may be presented via the HMI operator interface 44. Similarly, the controller 38 may be responsible for controlling one or more final control elements coupled to the components (e.g., the compressor 20, the turbine 26, the combustors 22, the load 34, and so forth) of the industrial system 10 such as, for example, one or more actuators, valves, transducers, and so forth.

In certain embodiments, the sensors 42 may be any of various sensors useful in providing various operational data to the controller 38. For example, the sensors 42 may provide pressure and temperature of the compressor 20, speed and temperature of the turbine 26, vibration of the compressor 20 and the turbine 26, $CO_2$ levels in the exhaust gas 36, carbon content in the fuel 31, temperature of the fuel 31, temperature, pressure, clearance of the compressor 20 and the turbine 26 (e.g., distance between the compressor 20 and the turbine 26 and/or between other stationary and/or rotating components that may be included within the industrial system 10), flame temperature or intensity, vibration, combustion dynamics (e.g., fluctuations in pressure, flame intensity, and so forth), load data from load 34, output power from the turbine 26, and so forth.

The controller 38 may include a processor(s) 39 (e.g., a microprocessor(s)) that may execute software programs to perform the disclosed techniques. Moreover, the processor 39 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory device 40 may store a variety of information, which may be suitable for various purposes. For example, the memory device 40 may store machine-readable and/or processor-executable instructions (e.g., firmware or software) for the processor execution. In one embodiment, the instructions, when executed, cause the processor 39 to create one or more models for use in forecasting behaviors of certain systems or components included in the power production system 10. By deriving forecasting models which may then be subsequently used in predicting behavior of certain operations, the techniques described herein provide for improved operational efficiency, improved maintenance operations and more efficient resource use for the power production system 10.

Figure 2:
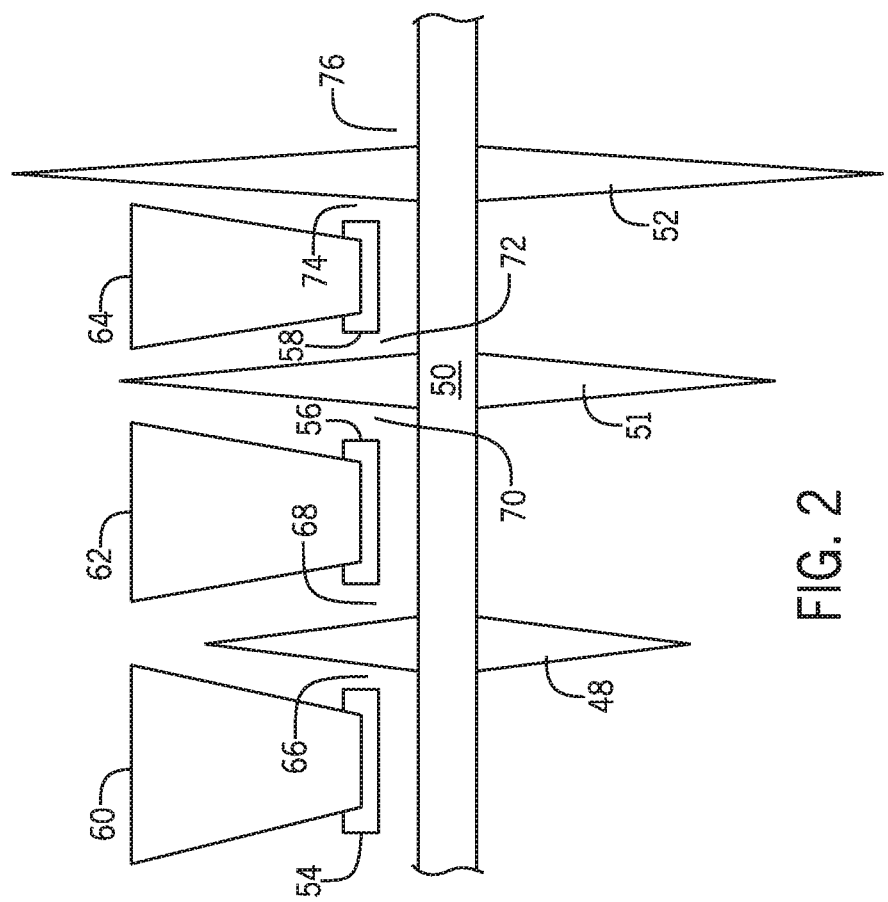
FIG. 2 depicts a detail view of an embodiment of components of the turbine system illustrated in FIG. 1.

FIG. 2 illustrates a detail view of an embodiment of a several turbine wheels 49 (e.g., turbine wheels 48, 51, and 52). Each turbine wheel 48, 51, or 52 is shown as coupled to the shaft system 50. In use, hot combustion gases cause the turbine wheels 48, 51, and 52 to rotate, thus providing for rotation of the shaft 50. As mentioned earlier, the rotating shaft 50 may then power the load 34, such as an electric generator, thus producing electrical power. During operations, sensors 42, such as temperature sensors 42, may be disposed between the wheels 48, 51, and 52 and used to sense wheel space temperatures. As described herein, a wheel space may be defined as a small axial distance between the rotating wheels (e.g., wheels 48, 51, and/or 52) and stationary components, such as stationary support rings or nozzle diaphragm 54, 56, 58 that may include certain turbine nozzles 60, 62, 64.

In the depicted embodiment, temperature sensors 42 may be disposed at locations 66, 68, 70, 72, 74, and 76. Location 66 may be a $1^{st}$ stage forward wheel space location, location 68 may be a $1^{st}$ stage aft wheel space location, location 70 may be a 2nd stage forward wheel space location, location 72 may be a 2nd stage aft wheel space location, location 74 may be a 3rd stage forward wheel space location, and location 76 may be a 3rd stage aft wheel space location. Other locations may be used. Further, certain sensor 42 data may be used in addition to or alternative to the wheel space temperatures. For example, compressor discharge pressures, compressor discharge temperatures, other pressures, temperatures, flows, fuel types, and so on, may be used.

As discussed in further detail below, the disclosed embodiments include the creation of a models, such as hybrid models, capable of analyzing data such, as wheel space temperatures, compressor discharge pressures, other temperatures (e.g., exhaust temperatures), flows, clearances, fuel types, and so on. Such hybrid models may be used, for example, to predict the risk of an unplanned event for a specific turbine system 10 in the fleet. Accordingly, risks associated with an unplanned maintenance event for an individual gas turbine system or unit 12 based on sensor 42 data may be calculated. Further, the hybrid models may be used to optimize operations for each or for all turbine units 12 in the fleet. For example, a more efficient maintenance and downtime schedule may be arrived at by using the predictive embodiments described herein. It is to be understood that the techniques described herein may be used in almost any mechanical system that experiences "wear and tear." Indeed, the CReAD system 45 may be used in a variety of mechanical systems to derive and predict a variety of mechanical events based on temperature sensor 42 data, such as wheel blade cracks, blade failures, component oxidation, burn through, and so on. However, the CReAD system 45 may use any data from the sensors 42 to predict or derive a number of issues, including mechanical issues, combustion issues, electrical/electronic issues, and so on, for the various component and/or system of the power production system 10.

FIG. 3 is a flow chart of an embodiment of a process 100 that may be used by the CReAD system 45 to derive certain models of a power production system, such as the power production system 10, including any components of the system 10. The models may then be used to analyze certain data, including real-time analysis, to derive predictions of unplanned maintenance events. It is to be understood, that the process 100 and the disclosed embodiments may be used with any machinery and/or turbomachinery, such as turbines, turbo expanders, compressors, and pumps. Turbines may include gas turbines, steam turbines, wind turbines, hydro turbines, and so forth. Further, the process 100 may include non-transitory machine readable code or computer instructions that may be executed by a processor (e.g., processor 39), and stored in memory, (e.g., memory 40). Indeed, the process 100 as well as any of the models described herein may be stored in the controller 38 and used to control, for example, logistic and maintenance activities related to the power production system 10 (e.g., turbomachinery 12 and turbomachinery's assets).

Accordingly, a variety of data 102 (e.g., logged data) from each individual power production system 10 may be collected and processed (block 104). Data 102 may include historical data and monitoring and diagnosis (M&D) data. Historical data may include a maintenance history for each power production system 10 (e.g., gas turbine system 12) in the fleet, including maintenance log data such as hardware configuration history, and date and type of repairs. The historical data may also include the dates and types of turbine 12 starts (e.g., hot start, medium start, cold start) and any unplanned maintenance events (e.g., wheel 48, 51, 52 events, or events for any components or systems of the power system 10). The M&D data may include data transmitted, for example, by sensors 42 at a number of locations and systems on the power production system 10. Additionally, the sensed data may include temperature, pressure, flow rate, rotation speed, vibration, and/or power generation (e.g., watts, amperage, volts).

A sensor determination (block 104) may be used to determine which subset (or the entirety) of the sensors 42 may be used. For example, certain sensors 42 may provide data 102 more indicative of certain issues. A data processing process (block 106) may be used to clean the data 102 and to select the subset of sensor 42 data from the data 102. A model building (block 108) may then define one or more models 110. In certain embodiments, the models 110 may include matrices from the subsets of the selected sensor 42 data. An example model matrix X may be:

$$X = \begin{bmatrix} X_{1,1} & X_{1,2} & \ldots & X_{1,p} \\ X_{2,1} & X_{2,2} & \ldots & X_{2,p} \\ \vdots & \vdots & \ddots & \vdots \\ X_{n_m,1} & X_{n_m,2} & \ldots & X_{n_m,p} \end{bmatrix}$$

where each row of the matrix represents a specific sensor 42 disposed in the power production system 10. For example, a row may represent a temperature sensor, a pressure sensor, a flow sensor, a torque sensor, a clearance sensor, and so on. Each column may represent a different time for sensed data, referred to here as vector. For example, column one may present time 1 vector containing values for all the specified sensors 42, column two may represent time 2, column three may represent time 3, and so on. Further, in certain embodiments, the matrix X may be a covariant matrix whose element in the i, j position is the covariance between the ith and jth elements of a random vector. A random vector may be a random variable with multiple dimensions.

In one embodiment, an automated system may collect sensor 42 data and may then derive the matrix X. Certain complex turbomachinery may have hundreds if not thousands of sensors 42 and each sensor 42 may collect data at frequent time intervals (e.g., every one or more microseconds, milliseconds, seconds, minutes, hours, and so on). The model building process may then divide the matrix X into one or more smaller matrices X1 . . . Xn (e.g., each matrix X1 . . . Xn included in a respective model 110), which may be covariance matrices whose element in the i, j position is the covariance between the ith and jth elements of a random vector.

The matrix X may be divided into one or more matrices X1 . . . Xn, so that each of the matrices X1 . . . Xn may have more correlated sensor 42 groups (e.g., a higher covariance as compared to the matrix X). Accordingly, each matrix X1 . . . Xn may include less sensor 42 rows than the matrix X. However, a specific sensor 42 row may also be found in more than one of the matrices X1 . . . Xn. Accordingly, even though a given model 110 may include a first matrix having sensor 42 that is not as accurate as desired, a second model 110 may include a second matrix having the same sensor 42 and may be more accurate. Cross sensitivity is thus reduced.

To divide matrix X into the matrices X1 . . . Xn, correlation analysis, (e.g., Pearson correlation or other correlation technique) may be used. Pearson correlation, which may also be referred to as finding a Pearson product-moment correlation coefficient, finds a measure of the linear dependence between two variables X and Y, giving a value between +1 and −1 inclusive, where 1 is total positive linear correlation, 0 is no linear correlation, and −1 is total negative linear correlation. For example, if there are 400 sensors 42 in the matrix X, the model building (block 108) may start with the first sensor (i.e., sensor 1) and determine which other ten sensors of the remaining 399 sensors are most correlated with sensor 1. For example, the top 10 sensors with the highest Pearson product-moment correlation coefficient based on sensor 1 may be found. These top 10 sensors may then be used to create the matrix X1. Then, the model building (block 108) may find the next sensor that is not included in matrix X1 and may derive the top 10 sensors that are most correlated with this sensor, including sensors that may already be found in matrix X1, and thus create matrix X2. The process may continue iterating until all of the 400 sensors are found in one or more of the matrices X1 . . . Xn. Each of the model(s) 110 may thus include one of the matrices X1 . . . Xn. It is to be understood that rather than finding the top 10 correlated sensors for each matrix X1 . . . Xn, other numbers, such as the top 2, 3, 4, 5, 6, 7, 8, 9, 10 or more correlated sensors may be used.

The matrices X1 . . . Xn may be further pruned down (e.g., block 108) to focus on certain failure modes. For example, certain of the matrices X1 . . . Xn that are more accurate in predicting a given failure mode (e.g., cracked blade in stage i, dirty compressor, dirty nozzle, combustion problems, flameout problems, temperature issues, and so on) may be selected. It is to be understood that multiple failure modes may be associated with the models, so block 108 may result in the selection of a subset of matrices that may focus on more than one failure mode.

The models 110 (e.g., matrix X and/or matrices X1 . . . Xn) may then be further processed via a modeling engine 112. For example, the modeling engine may execute a kernel regression derivation, more specifically, a covariance regression, to create one or more event prediction models 114. For example, a new observation or query vector x $$x = [x_1 x_2 \ldots x_p] \quad \text{Equation (1)}$$

may be used, where data point $x_1 x_2 \ldots x_p$ in the observation vector may include, for example, current operational data gathered from a specific sensor 42 at increasing time, e.g., time 1, 2, . . . p for a current power system 10, for example, data incoming from a system 10 that is producing power. An Euclidian distance $d_i$ $$d_i(X_i, x) = \sqrt{(\Delta X_{i,1})^2 + (\Delta X_{i,2})^2 + \ldots + (\Delta X_{i,p})^2} \quad \text{Equation (2)}$$

where $X_i$ is a vector (e.g., column) in the matrix X and/or matrices X1 . . . Xn. Indeed, as mentioned earlier, there may be more than one matrix X, e.g., matrices X1 . . . Xn, and the processing described herein with respect to matrix X may be applied to each of the matrices X1 . . . Xn.

To provide for model 114 estimates, a normalized vector difference may be used:

$$\Delta X_{i,p} = \frac{X_{i,p} - x_p}{\max(X_p) - \min(X_p)} \quad \text{Equation (3)}$$

Then, a Gaussian covariance kernel determining weights may be calculated:

$$w = K_H(d) = \sqrt{H^2} \cdot e^{-\frac{1}{2}\sqrt{(H \cdot d)^2}} \quad \text{Equation (4)}$$

Where, H is the corresponding vector-wise covariance matrix of model matrix X.

A prediction $\hat{x}$ may then be made:

$$\hat{x} = \frac{\sum_{i=1}^{n_m}(w_i X_i)}{\sum_{i=1}^{n_m} w_i} \quad \text{Equation (5)}$$

Further, a residual difference r between the prediction and the query vector x may be calculated as:

$$r = \hat{x} - x \quad \text{Equation (6)}$$

The techniques described herein use CReAD to mathematically optimize w (e.g., $K_H$) and $\hat{x}$. Indeed, rather than applying traditional bandwidth analysis in kernel regression estimator techniques such as Nadaraya-Watson (N-W) Estimators, which may include Auto-associative Kernel Regression (AAKR), the techniques described herein may replace traditional bandwidth analysis with automatically building the covariance matrix H and/or matrices H1 . . . Hn to derive one or more models that may apply sensor 42 data more accurately. That is a covariance regression is implemented by CReAD, which applies kernel regression (e.g., N-W Estimators) that use covariance matrices instead of bandwidth optimization. In some embodiments, other statistical measures such as correlation matrices may be used as alternative to or in addition to covariance matrices.

In operation, actual data 116 (e.g., operational data received via sensors 42 during operations of the system 10) may be used as input to the modeling engine 112 which includes the models 110 having the model matrix X and/or matrices X1 . . . Xn as well as the CReAD models 114. The models 114 may be derived by the modeling engine 112, for example, by applying the CReAD techniques described above to the models 110 (e.g., model matrix X and/or model matrices X1 . . . Xn and the corresponding covariance matrices H and/or H1 . . . Hn). The models 114 may be executed to derive an estimate 118 (e.g., prediction $\hat{x}$) and a residual r 120 (e.g., a prediction 118 and a residual r 120 per model 114). The residual r (e.g., |r|) may be compared to a range $R_t$. If $|r|>R_t$ then this may indicate that an issue has been found in the actual data 116. For example, the issue could be a cracked blade in stage i, dirty compressor, dirty nozzle, combustion problems, flameout problems, temperature issues, and so on. A decision process 122 may then be executed, for example, to address the issue. The decision process 122 may result in the automatic execution of certain actions, including control actions. For example, fuel flow and combustion parameters may be adjusted by the controller 38 to address the issue. Likewise, the decision process 122 may include alarms, alerts, automatic scheduling of maintenance, and so on. The decision process 122 may further include machine learning techniques that classify events as well as predict their likelihood and horizon. By providing for kernel regression techniques that use covariance matrices of sensors 42, the embodiments described herein may more accurately derive or predict the occurrence of the issues (e.g., cracked blade in stage i, dirty compressor, dirty nozzle, combustion problems, flameout problems, temperature issues, and so on).

It is also to be noted that a feedback loop may be used, that improves selection of the sensors 42 used to build the model matrix X and/or matrices X1 . . . Xn. For example, testing 124 may be performed via test data on the models 110 to and via a classification engine 126. The classification engine 126 may include classification trees, random forests, neural networks, genetic algorithms, and so on. The classification engine 126 may then be executed to classify or group sensors 42 into sets that improve prediction of certain issues. By way of example only, the classification engine 126 may determine that temperature sensors 42 disposed in the locations 66, 68, 70, 72, 74, and 76 and the sensors 42 disposed in the exhaust section 28 may be more accurately used to derive the models 110, 114 for blade wheel cracks, as opposed to only using the temperature sensors 42 on their own. Indeed, the classification engine 126 may automatically regroup sensors 42 so that, for example, the models 110, 114 may include sensor 42 data that more accurately predicts certain issues.

Technical effects of the invention include modeling techniques that enable the creation of model matrices having grouped sensor data. The model matrices may be automatically created via statistical techniques, such as Pearson correlation. The covariance matrices may then be further automatically converted, via covariance regression techniques such as Covariance Regression Anomaly Detection (CReAD), into covariance regression models suitable for predicting certain power production system issues. The covariance regression models may be applied to operational data (e.g., data gathered during operations, including ongoing operations, of the power production system) to predict that a certain issue is about to occur or has occurred.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a memory configured to store instructions; and
a processor configured to execute the instructions to:
receive sensor data comprising sensed operations for a machinery, the sensed operations sensed via one or more sensors disposed in the machinery;
derive a first model matrix based on the sensor data; and
derive a covariance regression model based on the first model matrix, wherein the covariance regression model is configured to be executed to derive a predictive event based on operational machinery data as input, wherein the first model matrix comprises a matrix $$X = \begin{bmatrix} X_{1,1} & X_{1,2} & \ldots & X_{1,p} \\ X_{2,1} & X_{2,2} & \ldots & X_{2,p} \\ \vdots & \vdots & \ddots & \vdots \\ X_{n_m,1} & X_{n_m,2} & \ldots & X_{n_m,p} \end{bmatrix}$$

wherein each row of the matrix X comprises the sensor data for a different sensor of the one or more sensors, wherein p comprises a number of sensor data points and $n_m$ comprises a total number of sensors selected into the matrix X.

2. The system of claim 1, wherein the processor is configured to execute the covariance regression model to derive the predictive event for the machinery.

3. The system of claim 1, wherein the processor is configured to derive a second model matrix from the first model matrix, wherein the second model matrix comprises a higher degree of correlation between sensor data than the first model matrix; and wherein the processor is configured to derive the covariance regression model based on the second model matrix instead of based on the first model matrix.

4. The system of claim 3, wherein the processor is configured to derive the second model matrix by applying a Pearson correlation to the matrix X.

5. The system of claim 3, wherein the processor is configured to:
derive a third model matrix from the first model matrix, wherein the third model matrix comprises a higher degree of correlation between sensor data than the first model matrix; and
derive a second covariance regression model based on the third model matrix, wherein the second covariance regression model is configured to be executed to derive the predictive event based on operational machinery data as input.

6. The system of claim 5, wherein the third covariance regression model is configured to be executed to derive a second predictive event based on operational machinery data as input.

7. The system of 1, wherein the processor is configured to derive the covariance regression model by executing, via the processor, a Covariance Regression Anomaly detection (CReAD) based on the first model matrix.

8. The system of claim 7, wherein executing, via the processor, the CReAD comprises deriving, via the processor, an euclidian distance $d_i(X_i,x) = \sqrt{(\Delta X_{i,1})^2 + (\Delta X_{i,2})^2 + ... + (\Delta X_{i,p})^2}$ wherein $X_i$ comprises the first model matrix and wherein x comprises an observation vector $x = [x_i\ x_2\ ...\ x_p]$ wherein $x_1\ x_2\ ...\ x_p$ comprise a plurality of measurements observed via the one or more sensors.

9. The system of claim 1, wherein the machinery comprises a gas turbine system and wherein the processor is configured to control the gas turbine system based on the predictive event.

10. A method, comprising:
receiving, via a processor, sensor data comprising sensed operations for a machinery, the sensed operations sensed via one or more sensors disposed in the machinery;
deriving, via the processor, a first model matrix based on the sensor data; and
deriving, via the processor, a covariance matrix based on the first model matrix; and
deriving, via the processor, a covariance regression model based on the covariance matrix, wherein the covariance regression model is configured to be executed to derive a predictive event based on operational machinery data as input, wherein the first model matrix comprises a matrix $$X = \begin{bmatrix} X_{1,1} & X_{1,2} & ... & X_{1,p} \\ X_{2,1} & X_{2,2} & ... & X_{2,p} \\ \vdots & \vdots & \ddots & \vdots \\ X_{n_m,1} & X_{n_m,2} & ... & X_{n_m,p} \end{bmatrix}$$

wherein each row of the matrix X comprises the sensor data for a different sensor of the one or more sensors, wherein p comprises a number of sensor data points and $n_m$ comprises a total number of sensors selected into the matrix X.

11. The method of claim 10, comprising executing, via the processor, the covariance regression model to derive the predictive event for machinery.

12. The method of claim 10, wherein the covariance matrix comprises an element in an i, j position, wherein the element is the covariance between an ith and a jth elements of a random vector.

13. The method of claim 10, wherein deriving, via the processor, the covariance regression model comprises executing, via the processor, a Covariance Regression Anomaly Detection (CReAD) based on the covariance matrix.

14. A tangible, non-transitory computer-readable media storing computer instructions thereon, the computer instructions, when executed by a processor, cause the processor to:
receive sensor data comprising sensed operations for a machinery, the sensed operations sensed via one or more sensors disposed in the machinery;
derive a first model matrix based on the sensor data; and
derive a covariance regression model based on the first model matrix, wherein the covariance regression model is configured to be executed to derive a predictive event based on operational machinery data as input, wherein the first model matrix comprises a matrix $$X = \begin{bmatrix} X_{1,1} & X_{1,2} & ... & X_{1,p} \\ X_{2,1} & X_{2,2} & ... & X_{2,p} \\ \vdots & \vdots & \ddots & \vdots \\ X_{n_m,1} & X_{n_m,2} & ... & X_{n_m,p} \end{bmatrix}$$

wherein each row of the matrix X comprises the sensor data for a different sensor of the one or more sensors, wherein p comprises a number of sensor data points and $n_m$ comprises a total number of sensors selected into the matrix X.

15. The computer-readable media of claim 14, comprising instructions that when executed by the processor cause the processor to execute the covariance regression model to derive the predictive event for the machinery.

16. The computer-readable media of claim 14, comprising instructions that when executed by the processor cause the processor to derive a second model matrix from the first model matrix, wherein the second model matrix comprises a higher degree of correlation between sensor data than the first model matrix; and cause the processor to derive the covariance regression model based on the second model matrix instead of based on the first model matrix.

17. The computer-readable media of claim 16, comprising instructions that when executed by the processor cause the processor to derive a third model matrix from the first model matrix, wherein the third model matrix comprises a higher degree of correlation between sensor data than the first model matrix; and
derive a second covariance regression model based on the third model matrix, wherein the second covariance regression model is configured to be executed to derive the predictive event based on operational machinery.

* * * * *